(12) United States Patent
Smolny et al.

(10) Patent No.: US 12,413,575 B2
(45) Date of Patent: Sep. 9, 2025

(54) AUTHENTICATING AND AUTHORIZING API CALLS WITH MULTIPLE FACTORS

(71) Applicant: INTERNATIONAL BUSINESS MACHINES CORPORATION, Armonk, NY (US)

(72) Inventors: Martin Smolny, Boeblingen (DE); Marco Pavone, Ehningen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 17/701,861

(22) Filed: Mar. 23, 2022

(65) Prior Publication Data
US 2023/0308432 A1    Sep. 28, 2023

(51) Int. Cl.
*H04L 9/40*    (2022.01)

(52) U.S. Cl.
CPC .......... *H04L 63/083* (2013.01); *H04L 63/102* (2013.01); *H04L 63/166* (2013.01); *H04L 63/20* (2013.01)

(58) Field of Classification Search
CPC ... H04L 63/083; H04L 63/102; H04L 63/166; H04L 63/20; H04L 67/10; H04L 2463/082; H04L 63/08
USPC .......................................................... 726/4
See application file for complete search history.

(56) References Cited

U.S. PATENT DOCUMENTS

| | | | |
|---|---|---|---|
| 8,776,190 B1* | 7/2014 | Cavage | G06F 21/62 380/255 |
| 2006/0156385 A1* | 7/2006 | Chiviendacz | H04L 9/3271 726/2 |
| 2009/0132807 A1 | 5/2009 | Schneider | |
| 2010/0107230 A1* | 4/2010 | Tyagi | H04L 65/1076 726/6 |
| 2011/0270751 A1* | 11/2011 | Csinger | G06F 21/40 705/42 |

(Continued)

OTHER PUBLICATIONS

International Search Report and Written Opinion dated Apr. 17, 2023 from International Application No. PCT/EP2023/054141 filed Feb. 20, 2023.

(Continued)

*Primary Examiner* — Jacob Lipman
(74) *Attorney, Agent, or Firm* — Garg Law Firm, PLLC; Rakesh Garg; Anthony Mauricio Pallone

(57) ABSTRACT

A method for authenticating and authorizing a user identifier to access a service is disclosed. The service is activated by a service application programming interface which requires a two-factor authorization to initiate execution of the service for the requesting user identifier. The method receives, by the service API, a service request together with first and second data for a first and a second authentication method, confirming a correctness of the first data as a first identity pass key using the first authentication method, confirming a correctness of the second data as a second identity pass key using the second authentication method and the first identity pass key is input to the second authentication method, and the second authentication method differs from the first authentication method. Having received the confirmed correctness of both the first identity pass key and the second identity pass key, executing the service.

20 Claims, 8 Drawing Sheets

(56) References Cited

U.S. PATENT DOCUMENTS

| | | | |
|---|---|---|---|
| 2014/0280595 A1* | 9/2014 | Mani | H04L 67/10 709/204 |
| 2016/0050234 A1* | 2/2016 | Choyi | H04L 63/20 726/1 |
| 2016/0381080 A1* | 12/2016 | Reddem | H04L 63/205 726/1 |
| 2017/0161486 A1 | 6/2017 | Jeon | |
| 2018/0097789 A1* | 4/2018 | Murthy | H04L 63/0227 |
| 2019/0028514 A1* | 1/2019 | Barboi | H04L 63/20 |
| 2019/0228144 A1* | 7/2019 | Kermes | H04L 63/0861 |
| 2020/0322324 A1 | 10/2020 | Chang | |
| 2022/0224692 A1* | 7/2022 | Milchtaich | G06F 21/31 |

OTHER PUBLICATIONS

"Configuring client certificates for server connections", IBM z/OS Connect Enterprise Edition, IBM Documentation, Downloaded from the Intrnet on Mar. 13, 2022, 3 pps., <https://www.ibm.com/docs/en/zosconnect/beta?topic=SS4SVW_beta/designing/api_client_auth.html>.

"Using client certificate authentication with the REST API and IBM MQ Console", 11 pps., Last Updated: Feb. 17, 2022, IBM MQ, 9.0, <https://www.ibm.com/docs/en/ibm-mq/9.0?topic=mcras-using-client-certificate-authentication-rest-api-mq-consol>.

Beswick, "Introducing mutual TLS authentication for Amazon API Gateway", Sep. 17, 2020, Amazon API Gateway, AWS Certificate Manager, Serverless, Permalink, AWS Compute Blog, 11 pps., <https://aws.amazon.com/blogs/compute/introducing-mutual-tls-authentication-for-amazon-api-gateway/>.

Mell et al., "The NIST Definition of Cloud Computing", National Institute of Standards and Technology, U.S. Department of Commerce, NIST Special Publication 800-145, Sep. 2011, 7 pages.

Sklenar, "Securing REST APIs With Client Certificates", Mar. 31, 19, Integration Zone, s) • Tutorial, DZone., 9 pps., <https://dzone.com/articles/securing-rest-apis-with-client-certificates>.

Response to communication pursuant to Rule 161(1) dated Feb. 18, 2025, Application No. 23706332.6, IBM Patent Reference, 8 pages.

\* cited by examiner

AUTHENTICATING AND AUTHORIZING API CALLS WITH MULTIPLE FACTORS

BACKGROUND

Field of the Invention

The present invention relates generally to an authenticating and authorizing method, and more specifically, to a computer-implemented method for authenticating and authorizing a user identifier to access a service. The invention relates further to an authentication and authorization system for authenticating and authorizing a user identifier to access a service, and a computer program product for authenticating and authorizing a user identifier to access a service.

Related Art

Privacy and data security continues to rank very high on the priority list of enterprise IT (information technology) departments. Use of a two-factor authorization method has become quite common in authentication of users. Two-factor authentication has not only become a common standard for accessing banking applications, but also for use in many enterprise applications. For example, a user wanting access to a specific enterprise application must enter a password and a code received separately on a smart phone.

Because of widely used cloud computing services, access from one cloud service to another can either be completely unsecured via an application programming interface (API) or secured by a simple authentication mechanism. More complex and reliable access methods between one service and another service, or from an identified user, by use of a user identifier, to a cloud service via an API, continues to be a rare case.

There are some disclosures focusing on the topic of more secure access between computing services. For example, document US 2017/0161486 A1 describes an API authentication method using two API tokens which includes issuing to a user device, a general API token and providing information required for a one-time API token. Additionally, document US 2009/0132807 A1 discloses a method and an apparatus for providing a security connection with a SSL/TSL-enabled server (Secure Socket Layer; Transport Layer Security). In one embodiment, a web client establishes a new connection by initiating a communication with the SSL/TSL-enabled server. The communication includes a non-POST request. After the client negotiates the secured connection with the server in response to the non-POST request, the client submits a POST request to the SSL/TSL-enabled server by a secured connection.

A disadvantage of known solutions may be that they can be computationally expensive, very complex to handle, and not user-friendly.

Hence, there may be a need to overcome these limitations and provide a highly secure API-based access to services, e.g., cloud computing services.

SUMMARY OF THE INVENTION

According to one aspect of the present invention, a computer-implemented method for authenticating and authorizing a user identifier to access a service may be provided. The service may be secured by an identity access management system and the service may be activated through a service application programming interface (API) that requires a two-factor authorization to start execution of the service for the requesting user identifier.

The method may comprise receiving, through the application programming interface of the service, a service request together with first data for a first authentication method and second data for a second authentication method, confirming a correctness of the first data as a first identity pass key using the first authentication method, confirming a correctness of the second data as a second identity pass key using the second authentication method, wherein the first identity pass key is used as input to the second authentication method and wherein the second authentication method differs from the first authentication method.

Additionally, the method may comprise executing the service upon having received confirmation of both the first identity pass key and the second identity pass key.

According to another aspect of the present invention, an authentication and authorization system for authenticating and authorizing a user identifier to access a service may be provided. The service may be secured by an identity access management system and the service may be activatable through a service application programming interface that requires a two-factor authorization to start an execution of the service for the requesting user identifier.

The system may comprise a processor and a memory, communicatively coupled to the processor, wherein the memory stores program code portions that, when executed, enable the processor, to receive, through the application programming interface of the service, a service request together with first data for a first authentication method and second data for a second authentication method.

The processor may also be enabled to confirm a correctness of the first data as a first identity pass key using the first authentication method to confirm a correctness of the second data as a second identity pass key using the second authentication method, wherein the first identity pass key is used as input to the second authentication method, and wherein the second authentication method differs from the first authentication method, and executing the service, upon having received confirmation of both the first identity pass key and the second identity pass key.

The proposed computer-implemented method for authenticating and authorizing a user identifier to access a service may offer multiple advantages, technical effects, contributions and/or improvements:

In summary, embodiments of the present invention acknowledge that service invocation in a cloud computing environment may be enhanced significantly. Today's technology of invocating a service using IAM (identity and access management) tokens or those that may invoke a service using IAM API keys as the only authentication method may be significantly improved. Embodiments may improve the operational reliability of public, hybrid and/or private cloud computing environments. Non-allowed access to the services handling sensitive data or those influencing critical infrastructure components (e.g., a power grid, a gas distribution system, water supply networks or a control of a power plant), may be prevented although the underlying computing technology may be based on cloud computing principles. Improved security results from the fact that access to a generally available service may only be granted using two authentication methods which have to be different, and which require that both authentication methods are controlled by an IAM system.

Hence, the two-factor/two-method authorization technology successfully implemented, for example, in access to bank accounts or shopping portals, can now be used in the context of cloud computing with the surprising effect that the probability for a misuse of generally available services may be reduced by a factor of at least 100.

Generally, the two-factor authentication methods may be selected according to the implementer's choice. However, a preferred embodiment may comprise that a first authentication method may be implemented using a client certificate (i.e., a certificate of the calling service). As a second authentication method, the usage of IAM tokens or IAM API keys may be used successfully. The options of authentication methods may offer different implementation choices.

As a result, a called service in the cloud computing environment would not start the execution (i.e., not initiated or not invocable), if the API might require two authentications and only one was successful.

In the following, additional embodiments of the inventive concept will be described and apply to the method, computer program product, and to the system as well.

According to a preferred embodiment of the method, the first authentication method may be based on a client security certificate. Furthermore, the second authentication method may be based on a security token or an application programming interface key. Although generally possible to use other combinations of authentication methods, the above-described combination of this embodiment may enable a comparably less complicated implementation starting with a security certificate of the client or client system. Furthermore, two alternatives may be considered for a second authentication method, which may be advantageous to a potential implementer.

According to another advantageous embodiment of the method, the first authentication method may use the mTLS (mutual transport layer security or, in short, only TLS) standard. Such implementation may be realized with any version or any release of the mTLS standard. mTLS is widely used in zero-trust security frameworks to validate users, devices and servers in an organization. Hence, mTLS may also be a good choice as a basic interfacing protocol for mutual authentication of APIs.

According to one embodiment of the method, confirmation of the correctness of the first data and the second data may be performed through an identity access management (IAM) system. Both the first and the second authentication methods may either be secured by the same or different IAM systems, which may expand the implementation options of the proposed concept.

According to some embodiments of the method, the confirming of the first data and the confirming of the second data may be performed through the requested service or by a separate service in communicative contact with the requested service. These options may offer interesting implementation alternatives. The separate service may be an integral part of the requested service (i.e., the service to be executed after the authenticating has been established) or the separate service may be a stand-alone service which may be used by a plurality of different requested services.

According to an optional embodiment of the method, the client certificate may originate from an identity access management system, (e.g., may be generated by the IAM system). Alternatively, and according to another optional embodiment of the method, the client certificate may also be user generated and subsequently uploaded. Hence, there may be different implementation options for the main method.

According to one enhanced embodiment of the method, the requested service may be integrated into a combined service, such that a security service portion may be integrated into the combined service and may comprise an mTLS endpoint of the first authorization method.

According to one embodiment of the method, the security service may also comprise an inner security service for an authentication via a token or an application programming interface key. As an alternative, an IAM system may also be used for both authentication activities.

According to an optional embodiment of the method, the requested service may be executed in a cloud computing environment. This may be of particular interest for users offering or requesting a large plurality of different cloud computing services in hybrid or multi-cloud environments. In such cases, the security and integrity of data and user access may be increased beyond a security threshold in order to comply with government regulations.

Furthermore, embodiments may take the form of a related computer program product, accessible from a computer-readable storage medium providing program code for use, by, or in connection with, any programmable, instruction execution device or system. For the purpose of this description, a computer-readable storage medium may be any apparatus that may contain means for storing, communicating, propagating or transporting the program for use, by, or in connection, with the programmable, instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, any combination between features relating to different subject matters, in particular, between features of the method type claims and features of the apparatus type claims, is considered as disclosed within this document.

The aspects defined above, and further aspects of the present invention are apparent from the examples of embodiments to be described hereinafter and are explained, but not limited, with reference to the examples of embodiments.

Figure 1:
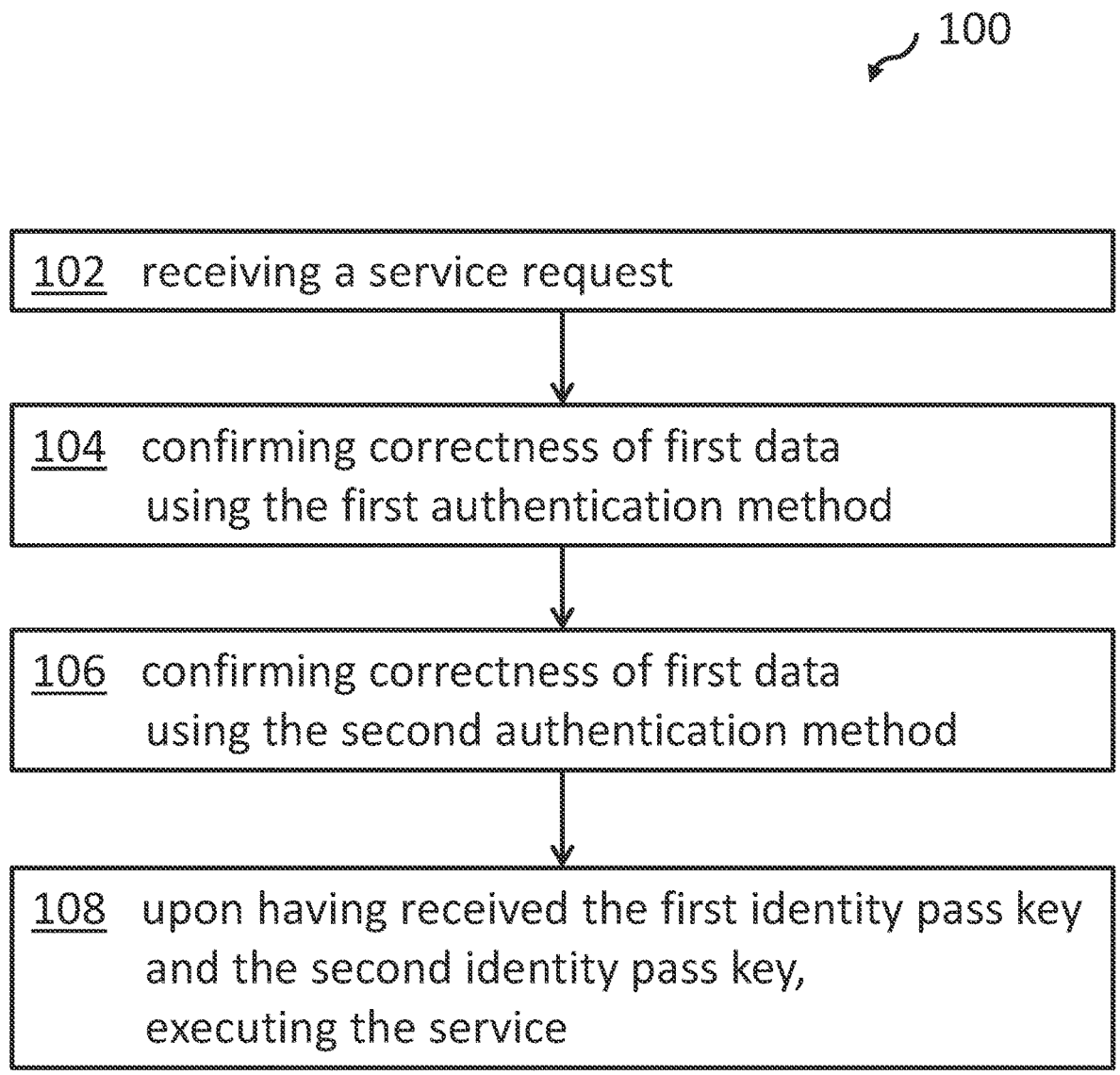

Preferred embodiments of the invention will be described, by way of example, and with reference to the following drawings:

FIG. 1 shows a block diagram of an embodiment of the inventive computer-implemented method for authenticating and authorizing a user identifier to access a service.

Figure 2A:
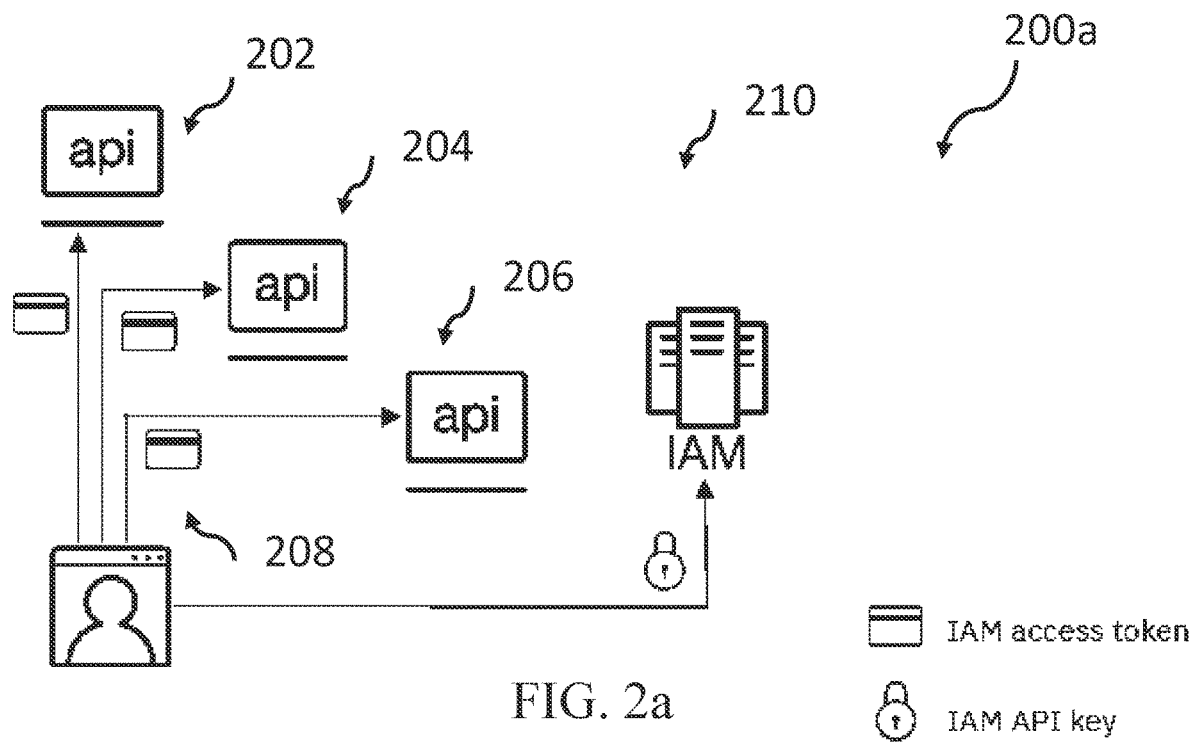

FIG. 2*a* shows a block diagram with known access methods to APIs of services.

Figure 2B:
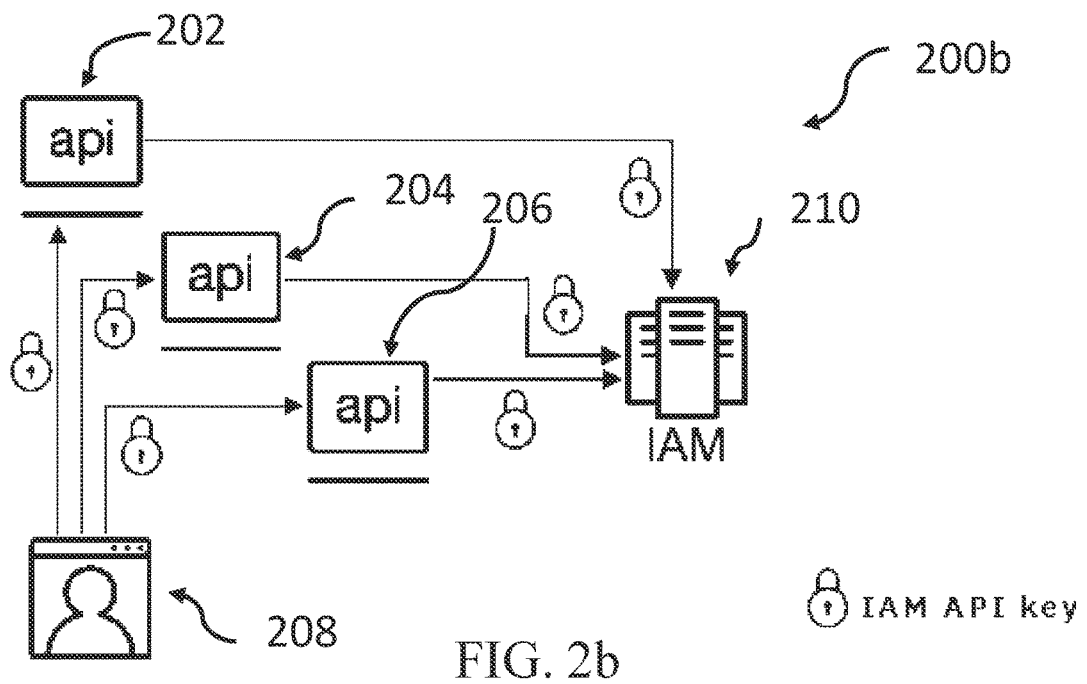

FIG. 2*b* shows a block diagram with known access method to APIs of services.

Figure 3:
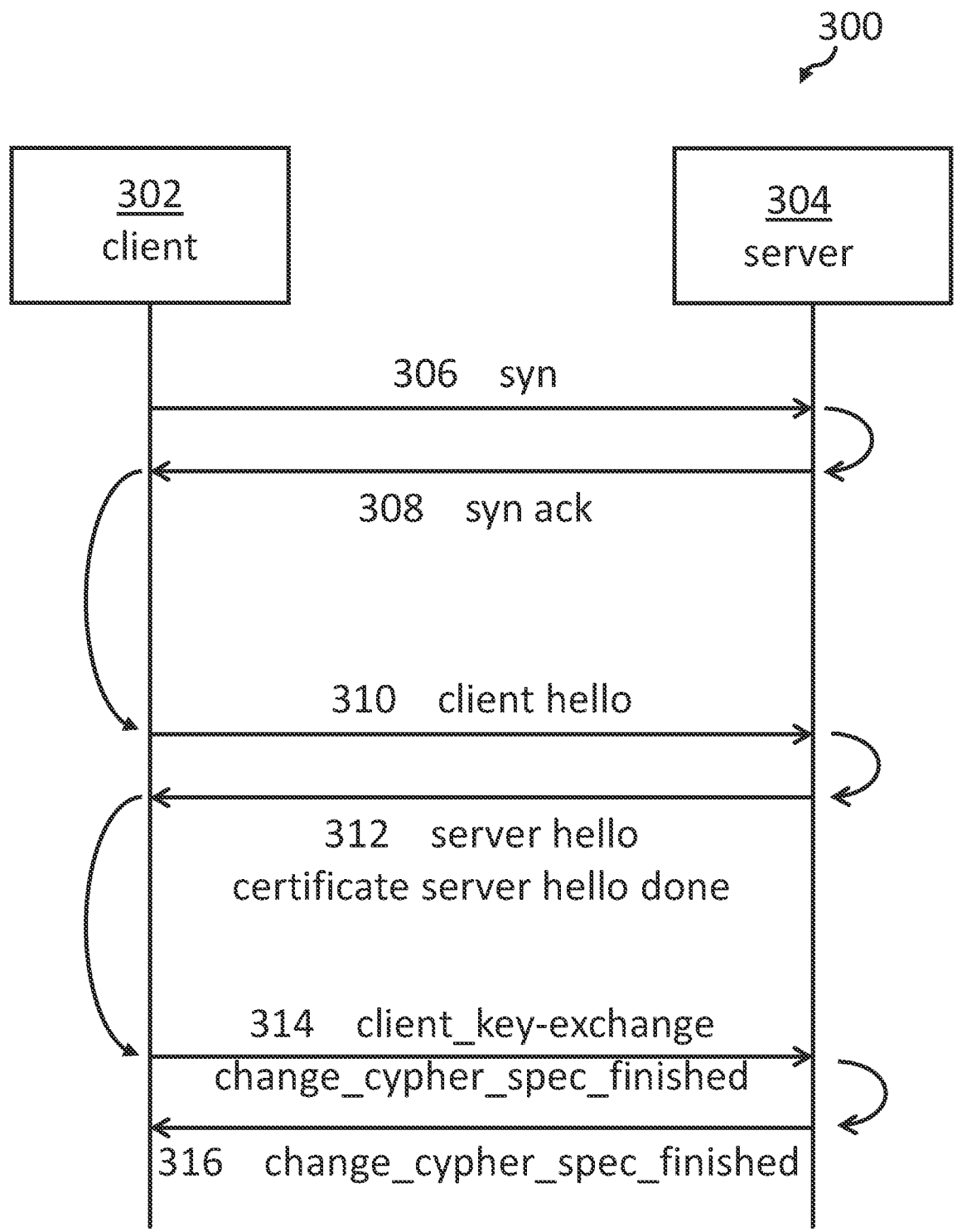

FIG. 3 shows a communication diagram illustrating the fundamental mechanism of the mutual Transport Layer Security (mTLS) protocol.

Figure 4:
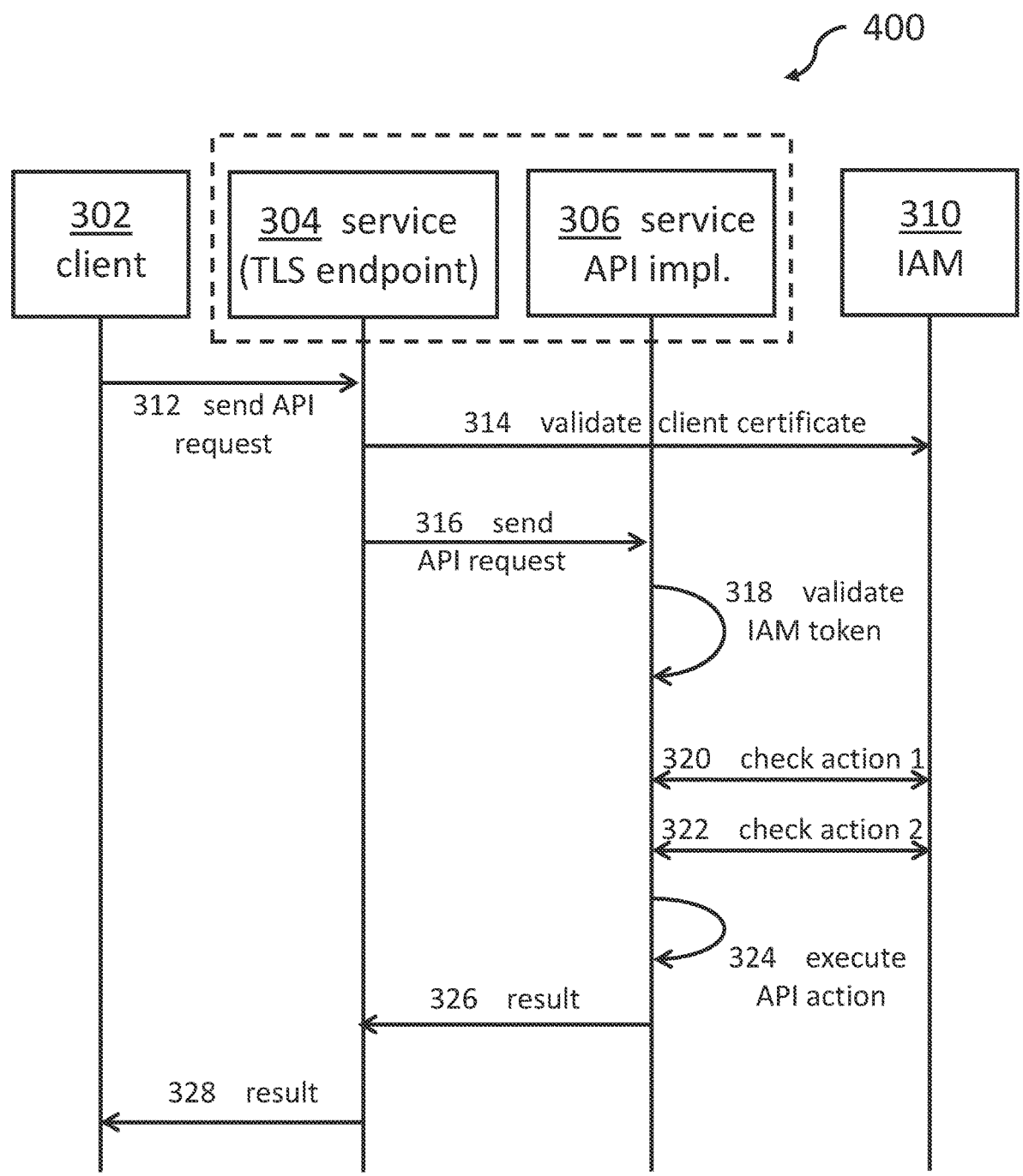

FIG. 4 shows a communication diagram illustrating the principal communication flow of components of the proposed concept.

Figure 5:
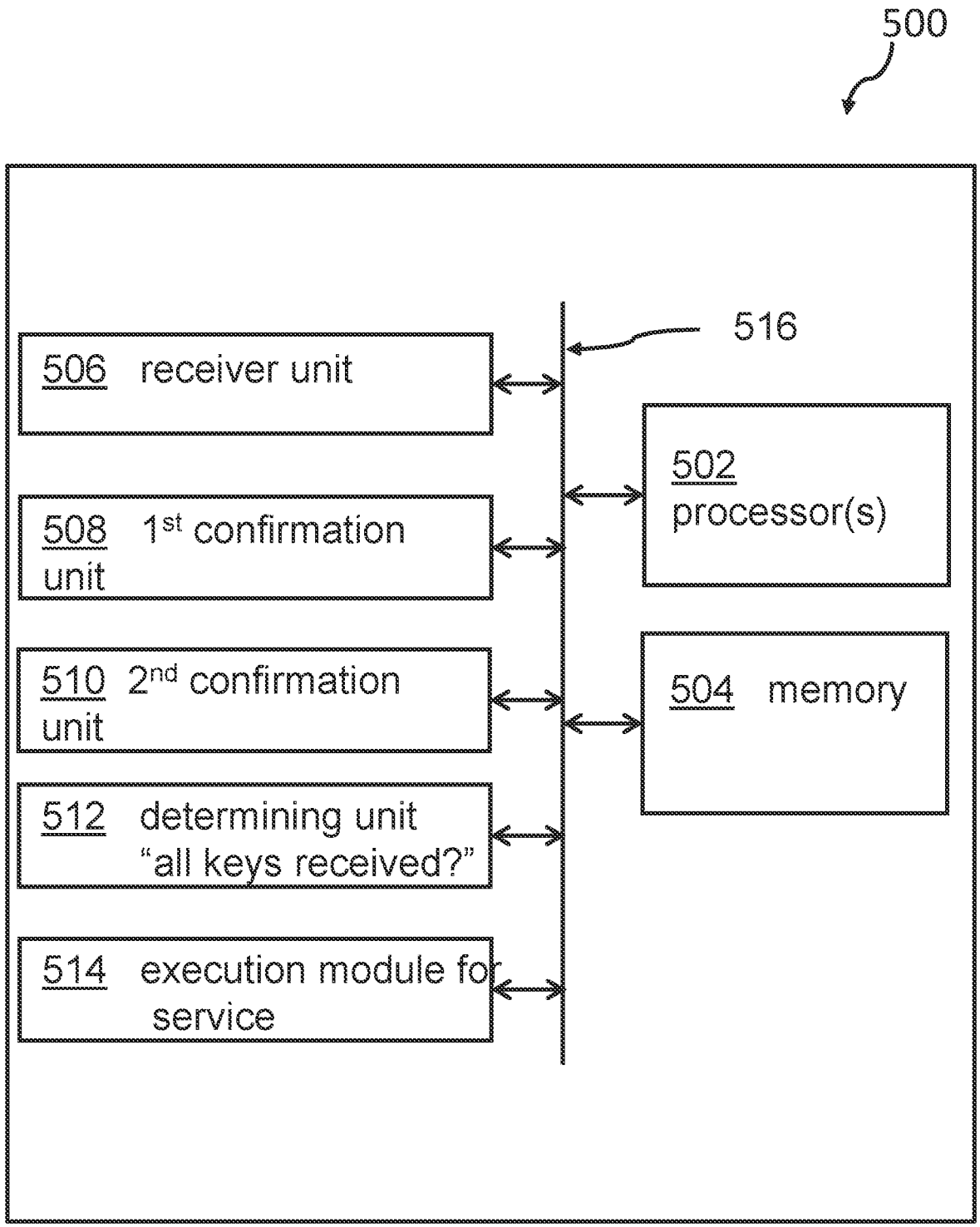

FIG. 5 shows a block diagram of an embodiment of the system for authenticating and authorizing a user identifier to access a service.

Figure 6:
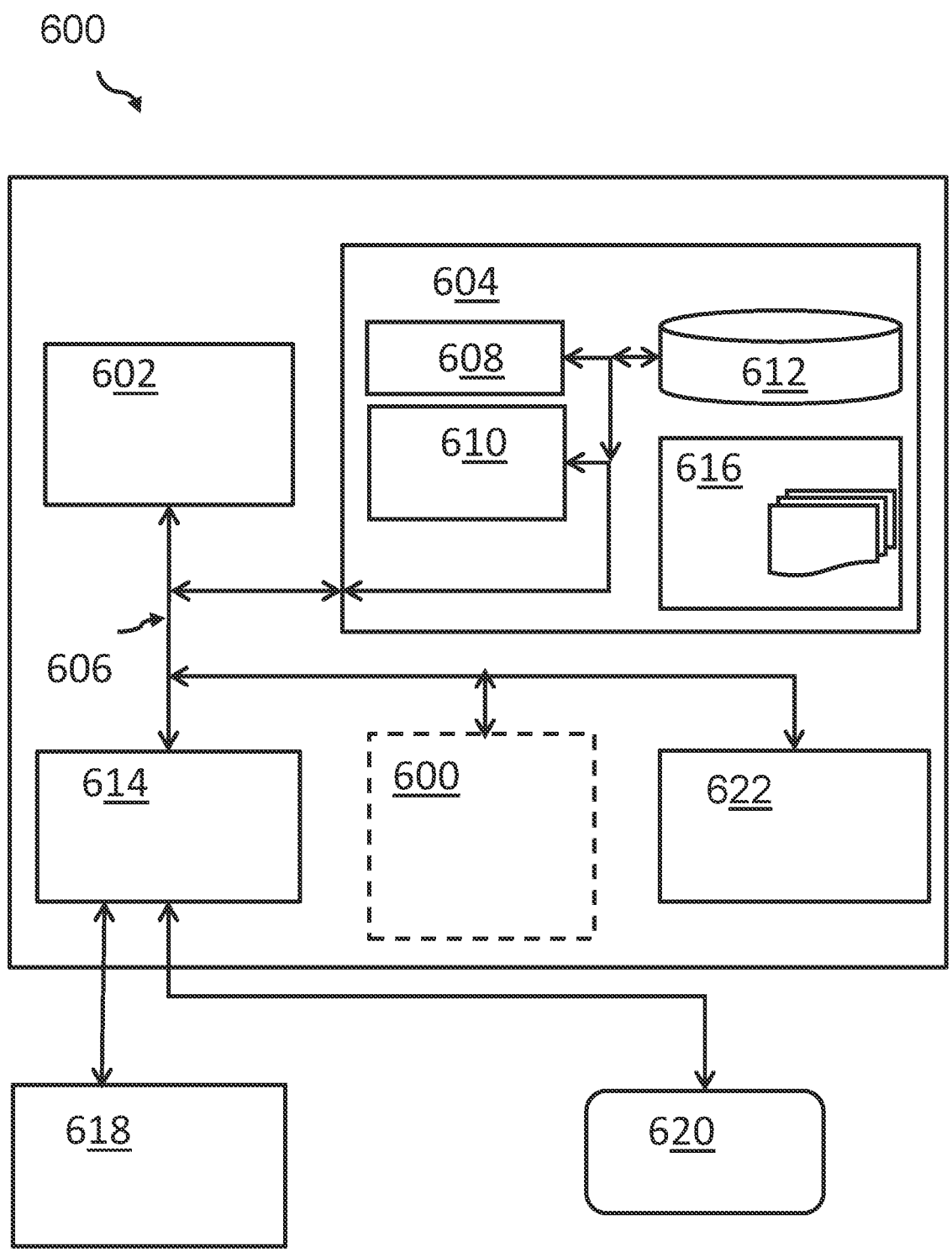

FIG. 6 shows an embodiment of a computing system according to FIG. 5.

Figure 7:
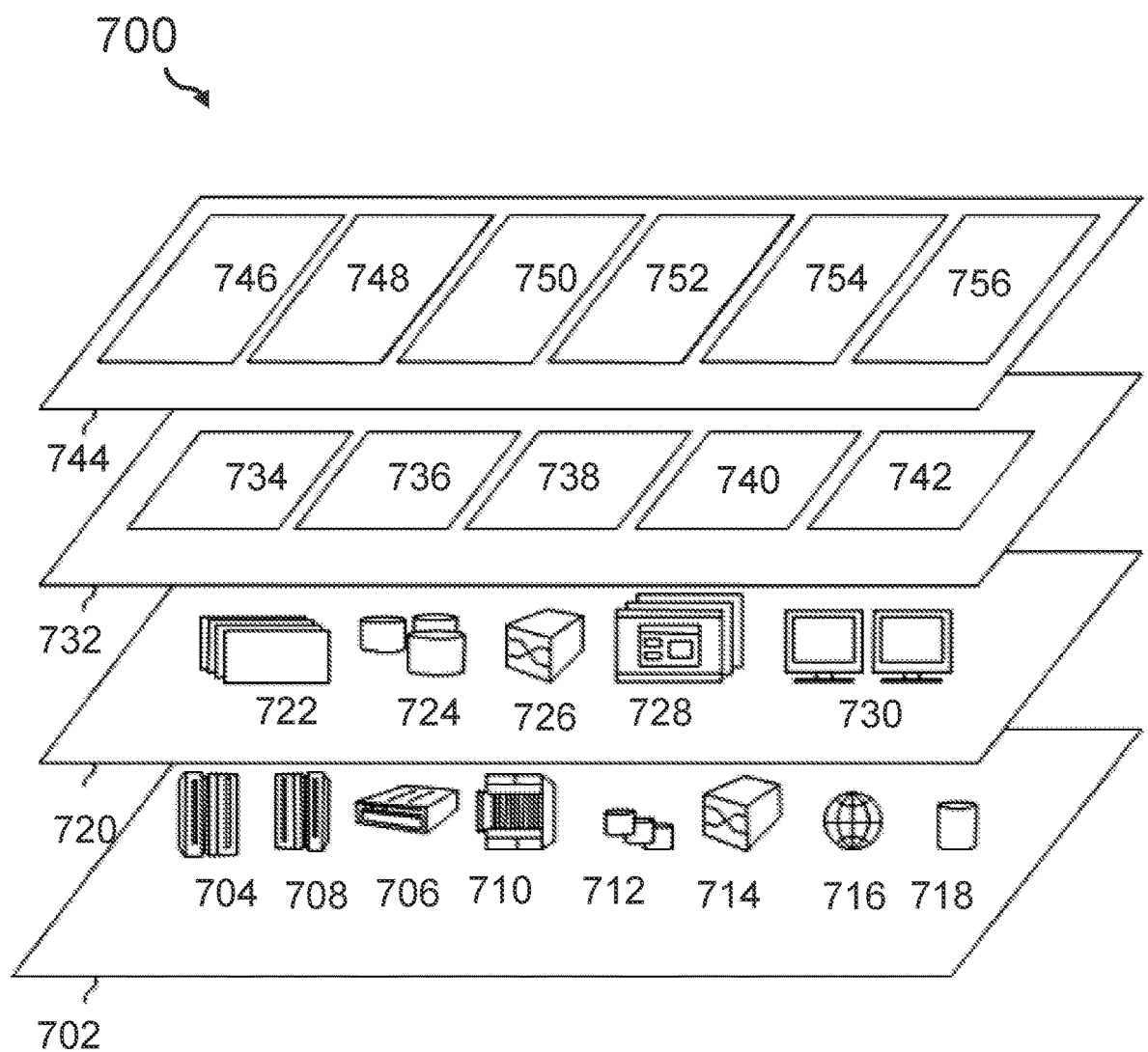

FIG. 7 shows a cloud computing environment in which at least parts of the inventive concept may be deployed.

Figure 8:
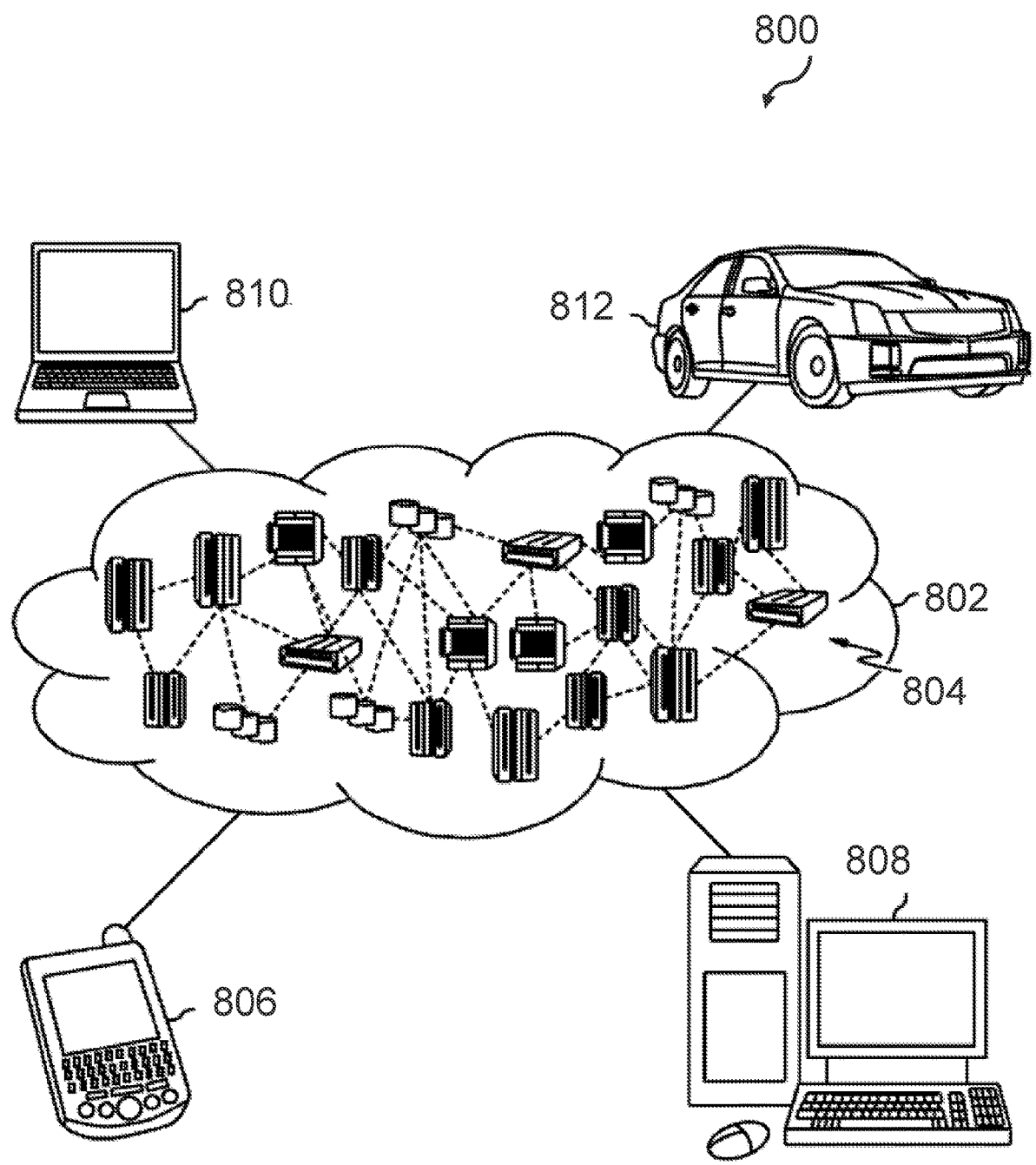

FIG. 8 shows components of a cloud computing environment.

DETAILED DESCRIPTION

In the context of this description, the following conventions, terms and/or expressions may be used:

The term "authenticating and authorizing" denotes a two-step process in which firstly, a calling or requesting entity must establish confirmed authentication (i.e., authenticating) and secondly, the authenticated entity may have authorization to access certain resources, (i.e., the requested service). As an example, a cloud computing environment may be used in which a first step includes confirmation of a correct authentication of a requestor. The first authentication confirmation step may be performed via an IAM API key or an IAM token used in a TLS connection. In some embodiments, a policy enforcement point (PEP) may be enabled to intercept a user's access request and calls a policy decision point (PDP), which may evaluate access requests against authorization policies and enforces the decision. In such an environment, the policy administration point (PAP) collaborates with a PDP in order to manage access authorization policies.

It may be added that the authentication methods used here should be structured in a way so that an implementation does not require user intervention (i.e., implementation of the authentication methods does not require user input). Generally, the authentication factor could be used in the form of a username and password, an IAM token, an IAM API key, a client certificate, or an algorithm that may determine a TOTP (time-based one-time password) value from a stored secret.

The term "user identifier" may denote a code used to uniquely identify (e.g., UID) a user operating an application of a computing device making a request to an API of a service (i.e., service call) or a related service making a request to an API of another service. Use of the user identifier may be instrumental to unambiguously manage access rights to services (e.g., handling access to sensitive data).

The term "access a service" may denote performing a service request from one service to another using an API.

The term "identity access management system" (IAM system), also known as identity and access management (IdAM system) may be based on a framework of policies and technologies to ensure that the right users (in an enterprise) have the appropriate access to technology resources. IdAM systems fall under the overarching umbrellas of information technology (IT) security and data management. Identity and access management systems identify, authenticate, and control not only access for individuals who will be utilizing IT resources but also the hardware and applications that employees need to access.

The term "application programming interface" (API) denotes a connection between computers or between computer programs (i.e., services). An API may be a type of software interface, offering a service to other pieces of software. A document or standard that describes how to build or use such a connection or interface is called an API specification.

The term "two-factor authentication" denotes the use of two different security methods before allowing access to a certain service (i.e., before a requesting service or user submitting the service request has been authorized to access or execute that service).

The term "service request" denotes an invocation of a service from another service.

The terms "first data" and "second data" denote data used in the context of the first authentication method and, respectively, the second authentication method.

The term "identity pass key" can be seen as equivalent to the first data in the context of the first authentication method and the second data in the context of the second authentication method.

The term "client security certificate" denotes a code that is either generated by an IAM or by a calling service, to provide confirmation of the identity of the client.

The term "security token" denotes a code required to access a service, wherein the security token may be confirmed by an IAM system before the service is executed.

The term "application programming interface key" (API key) denotes a code without which access to the API is not possible (i.e., the API is secured by the API key). Hence, a service initiated by access to the API will not be executed without providing the correct API key together with other parameters required for the API.

The term "mTLS standard" denotes the known mutual Transport Layer Security (mTLS or in short, TLS). Known as a protocol, the mTLS is a cryptographic protocol designed to provide communications security over a computer network. Secure Sockets Layer (SSL) is a widely use successor to mTLS.

The term "cloud computing" and the more specific term "cloud service environment" may be interpreted in the current context as a model for enabling convenient, on-demand network access to a shared pool of configurable computing resources (e.g., networks, servers, storage, applications, and services) that can be rapidly provisioned and released with minimal management effort or service provider interaction. The cloud service environment model promotes availability and is composed of at least five essential characteristics, three service models, and four deployment models.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Essential characteristics of cloud computing comprise:
On-demand self-service: A consumer can unilaterally and automatically provision computing resources, such as server time and network storage, when needed without requiring human interaction with each service provider.
Broad network access: Resources and functional capabilities are available over the network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model with different physical and virtual resources that are dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth, and virtual machines.

Rapid elasticity: Computing resources can be rapidly and elastically provisioned, in some cases automatically, to quickly scale out and rapidly release to quickly scale in. To the consumer, the computing resources available for provisioning often appear to be unlimited and can be purchased in any quantity at any time.

Measured Service: Cloud systems automatically control and optimize resources used by leveraging a metering capability at some level of abstraction that is appropriate to the type of service (e.g., storage, processing, bandwidth, and active user accounts). Resource usage can be monitored, controlled and reported providing transparency for both the provider and consumer of the utilized service.

Service models for cloud computing use comprise:

Software as a Service (SaaS): The service capability provided to the consumer is the use of the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The service capability provided to the consumer is to deploy onto the cloud infrastructure consumer-created or acquired applications that have been created using programming languages and tools supported by the provider. The consumer does not manage or control the underlying cloud infrastructure including network, servers, operating systems, or storage, but has control over the deployed applications and possibly application hosting environment configurations.

Infrastructure as a Service (IaaS): The service capability provided to the consumer includes providing processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

Private cloud: The cloud infrastructure is operated solely by an organization. It may be managed by the organization or a third party and may exist on premise or off premise.

Community cloud: The cloud infrastructure is shared by several organizations and supports a specific community that has shared concerns (e.g., mission, security requirements, policy, and compliance considerations). It may be managed by the organizations or a third party and may exist on premise or off premise.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. FIG. 1 illustrates a block diagram of an embodiment of the inventive computer-implemented method for authenticating and authorizing a user identifier to access a service is given. Discussion of subsequent Figures describe and depict aspects of additional embodiments of the authentication and authorization system for authenticating and authorizing a user identifier to access a service.

FIG. 1 shows a block diagram of a preferred embodiment of the computer-implemented method 100 for authenticating and authorizing a user identifier to access a service. The service is secured by an identity access management system, and the service is activated through a service application programming interface (API) that requires a two-factor authorization to initiate execution of the service for the requesting user identifier. For the two-factor authorization, a preferred solution is based on a client certificate as well as an IAM token. The method 100 comprises receiving a service request (step 102), through the application programming interface of the service. The request is received with first data for a first authentication method, which may be the previously described client security certificate. The received request also includes second data for a second authentication method, which in some embodiments, may be a security token, for example.

Method 100 confirms a correctness of the first data using the first authentication method (step 104). In some embodiments, method 100 uses an IAM system for confirming that the first data correctly matches the first identity pass key for the first authentication method. Method step 106 confirms a correctness of the second data, which may also be confirmed by use of the IAM system, utilizing a second identity pass key, different from the first identity pass key, for the second authentication method. For the two-factor authentication method, the confirmed correct first identity pass key is used as input to enable use of the second identity pass key for the second authentication method. Furthermore, the second authentication method differs from the first authentication method.

Additionally, upon having received and confirmed the first identity pass key and having received and confirmed the second identity pass key, method step 108 activates execution of the service and optionally delivers a result of the service to the requesting/calling service via the service API.

FIGS. 2a and 2b show two block diagrams 200a, 200b, with known access methods to APIs of services as background information. FIG. 2a shows the known method of an invocation of service 202, 204, 206, each of which having an API, by a requestor 208. The requestor 208 accesses the IAM system 210 for an IAM access token using the API key and can use the API to input the service request by confirmation of the IAM API key.

FIG. 2b shows a known implementation in which a requestor 208 accesses the services 202, 204, 206, each of which has an API, via an IAM API key. The IAM API key can be verified by the IAM system 210.

FIG. 3 shows a communication diagram 300 illustrating the fundamental mechanism of the mTLS security protocol between a client 302 and a server 304, which can also be used as part of the two-factor authentication method proposed herein. Client 302 sends a synchronization signal 306 to server 304. Server 304 sends a synchronization acknowledgement signal 308 back to client 302. Client "hello" signal 310 and server "hello" signal 312 are exchanged with server hello signal 312 including certificate server hello done. Client 302 responds with client_key-exchange signal 314 and receives from the server change_cypher_spec_finished signal 316.

According to this protocol, it is mandatory that the server identifies itself by presenting its SSL (secure socket layer) certificate; and the server needs to have the appropriate private key that belongs to the SSL certificate. Optionally, the client identifies itself by presenting its SSL certificate and the client needs to have the appropriate private key that belongs to the SSL certificate.

FIG. 4 shows a communication diagram 400 illustrating the principal communication flow of components of the proposed concept. Components of FIG. 4 include client 302, server service 304 with TLS endpoint, and server service 306 with API implementation. Server services 304 and 306 may be separate services or the service TLS endpoint 304 may be integrated into server service 306. The common dashed line around server service 304 and server service 306 indicated the potential integration of the two services.

The protocol starts with sending of API request 312 with an IAM token via mTLS. Server service 304 with TLS endpoint validates client certificate 314 using IAM server 310, establishing authentication/authorization identity 1. Subsequently, server service 304 with TLS endpoint sends API request 316 with an IAM token plus authentication identity 1 from the client certificate to server service 306, which includes the service request by client 302. Server service 306 validates IAM token 318 establishing authentication/authorization identity 2.

Furthermore, the service 306 performs an authentication check 1, 320, against the identities 1 and 2 to confirm authorization of the identities 1 and 2 against the first action (i.e., confirming authorization of either identity 1 or 2 for action of a "GET" command), and performs another authentication check 2, 322, against a remaining identity of identity 1 and 2 for a second action (i.e., "CONNECT" command authorizing connection to the API to access the requested service). These two authentication checks represent the PEP activity (previously discussed). Subsequent to confirming authorization for actions for both authentication identities, service 306 executes API action 324, performing the requested service function. Server service 304 with TLS endpoint receives result 326, which transmits result 328 to the calling or requesting client 302 (or requesting service of client 302).

The IAM-enabled service requires two permissions to initiate the requested service. Confirmation of a first identity verifies and validates that identity 1 has an associated policy that permits a first action (i.e., (i) action "GET"). Confirmation of a second identity verifies and validates that identity 2 has an associated policy that permits a second action (i.e., "CONNECT"). Identities 1 and 2 serve as the two-factor authentication/authorization components of embodiments of the present invention for authorizing a request for an API-provided service.

FIG. 5 shows a block diagram of an embodiment of method 500 for authenticating and authorizing a user identifier to access a service. Here too, the service is secured by an identity access management system and, the service can be activated by a service application programming interface which requires a two-factor authorization in order to start execution of the service for the requesting user identifier. The system 500 comprises a processor 502 and a memory 504, communicatively coupled to the processor 502, wherein the memory stores program code portions that, when executed, enables the processor 502, to receive via a receiver unit 506, a service request that includes first data for a first authentication method and second data for a second authentication method to access and receive the requested service from the application programming interface of the service, The processor 502 is further enabled to confirm, by a first confirmation unit 508, a correctness of the first data as a first identity pass key using the first authentication method, and to confirm, by a second confirmation unit 510 a correctness of the second data as a second identity pass key using the second authentication method. Thereby, the first identity pass key is used as input along with the second data for the second authentication method, and the second authentication method differs from the first authentication method.

Additionally, upon having received the first identity pass key and the second identity pass key which is determined by the determining unit "all keys received?" 512, the processor 502 is furthermore enabled to execute the service, in particular supported by the execution module for the service 514.

It shall also be mentioned that all functional units, modules and functional blocks, in particular, the processor 502, the memory 504, the receiver unit 506, the first confirmation unit 508, the second confirmation unit 510, the determining unit 512 and the execution module for the service 514, may be communicatively coupled to each other for signal or message exchange in a selected one-to-one manner. Alternatively, the functional units, modules and functional blocks can be linked to a system internal bus system 516 for a selective signal or message exchange.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, and removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the authentication and authorization system 500 method for authenticating and authorizing a user identifier to access a service may be attached to the bus system 606.

FIG. 7 shows a cloud computing environment 700 in which at least parts of the inventive concept may be deployed. A set of functional abstraction layers provided by a cloud computing environment is shown. It should be understood in advance that the components, layers, and functions, shown in FIG. 7, are intended to be illustrative only, and embodiments of the invention are not limited thereto. As depicted, the following layers and corresponding functions are provided: Hardware and software layer 702 include hardware and software components. Examples of hardware components include: mainframes 704; servers 706; RISC (Reduced Instruction Set Computer) architecture based servers 708; blade servers 710; storage devices 712; networks 714 and networking components 714. In some embodiments, software components include network application server software 716 and/or database software 718.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 732 may provide the functions described below. Resource provisioning 734 provides dynamic procurement of computing resources and other resources that are utilized to perform tasks within the cloud computing environment. Metering and pricing 736 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 738 provides access to the cloud computing environment for consumers and system administrators. Service level management 740 provides cloud computing resource allocation and management such that required service levels are met. Service Level Agreement (SLA) planning and fulfillment 742 provides pre-arrangement for, and procurement of, cloud computing resources for which a future requirement is anticipated in accordance with an SLA.

Workload layer 744 provides examples of functionality for which the cloud computing environment may be utilized. Examples of workloads and functions which may be provided from this layer include: mapping and navigation 746; software development and lifecycle management 748; virtual classroom education delivery 750; data analytics processing 752; transaction processing 754; and other endpoint services or systems 756, such as the two-factor authentication and authorization inventive concept, for API service delivery, described herein, (compare also FIG. 5, 500).

FIG. 8 shows components 800 of a cloud computing environment 802. As shown, cloud computing environment 802 comprises one or more cloud computing nodes 804 with which local computing devices used by cloud consumers, such as, for example, personal digital assistant (PDA) or cellular telephone 806, desktop computer 808, laptop computer 810, and/or automobile computer system 812 may communicate. Nodes 804 may communicate with one another. They may be grouped (not shown) physically or virtually, in one or more networks, such as Private, Community, Public, or Hybrid clouds as described hereinabove, or a combination thereof. This allows cloud computing environment 802 to offer infrastructure, platforms and/or software as services for which a cloud consumer does not need to maintain resources on a local computing device. It is understood that the types of computing devices 804 shown in FIG. 8 are intended to be illustrative only and that computing nodes 10 and cloud computing environment 802 can communicate with any type of computerized device over any type of network and/or network addressable connection (e.g., using a web browser).

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a, an, and the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The inventive concept may be summarized by the following clauses:

1. A computer-implemented method for authenticating and authorizing a user identifier to access a service, wherein the service is secured by an identity access management system, wherein the service is being activatable through a service application programming interface that requires a two-factor authorization in order to start an execution of the service for the requesting user identifier, wherein the method comprises:

receiving, by the application programming interface of the service, a service request together with first data for a first authentication method and second data for a second authentication method, confirming a correctness of the first data as a first identity pass key using the first authentication method, confirming a correctness of the second data as a second identity pass key using the second authentication method, wherein the first identity pass key is used as input second authentication method, and wherein the second authentication method differs from the first authentication method, and upon having received the first identity pass key and the second identity pass key, executing the service.

2. The method according to clause 1, wherein the first authentication method is based on a client security certificate and wherein the second authentication method is based on a security token or an application programming interface key.

3. The method according to clause 1 or 2, wherein the first authentication method uses the mTLS standard.

4. The method according to any of the preceding clauses, wherein confirming the correctness of the first data and the second data is performed by the identity access management system.

5. The method according to any of the preceding clauses, wherein confirming the first data and the confirming the second data is performed by the requested service or by a separate service in communicative contact with the requested service.

6. The method according to any of the preceding clauses, wherein the client certificate originates from an identity access management system.

7. The method according to any of the preceding clauses, wherein the client certificate is user generated.

8. The method according to any of the preceding clauses, wherein the target service is integrated in a combined service, wherein a security service portion is integrated into the combined service and comprises an mTLS endpoint of the first authorization method.

9. The method according to clause 8, wherein the security service further comprises an inner security service for an authentication via a token or an application programming interface key.

10. The method according to any of the preceding clauses, wherein the target service is executed in a cloud computing environment.

11. A authentication and authorization system for authenticating and authorizing a user identifier to access a service, wherein the service is being secured by an identity access management system, wherein the service is being activatable through a service application programming interface which requires a two-factor authorization in order to start an execution of the service for the requesting user identifier, wherein the system comprises a processor and a memory, communicatively coupled to the processor, wherein the memory stores program code portions that, when executed, enable the processor, to receive, by the application programming interface of the service, a service request together with
first data for a first authentication method and
second data for a second authentication method.

confirm a correctness of the first data as a first identity pass key using the first authentication method, confirm a correctness of the second data as a second identity pass key using the second authentication method, wherein the first identity pass key is used as input second authentication method, and wherein the second authentication method differs from the first authentication method, and upon having received the first identity pass key and the second identity pass key, execute the service.

12. The system according to clause 11, wherein the first authentication method is based on a client security certificate and wherein the second authentication method is based on a security token or an application programming interface key.

13. The system according to clause 11 or 12, wherein the first authentication method uses the mTLS standard.

14. The system according to any of the cause 11 to 13, wherein confirming the correctness of the first data and the second data is performed by the identity access management system.

15. The system according to any of the cause 11 to 14, wherein confirming the first data and the confirming the second data is performed by the requested service or by a separate service in communicative contact with the requested service.

16. The system according to any of the cause 11 to 15, wherein the client certificate originates from an identity access management system.

17. The system according to any of the cause 11 to 16, wherein the client certificate is user generated.

18. The system according to claim 11, wherein the target service is integrated in a combined service, wherein a security service portion is integrated into the combined service and comprises an mTLS endpoint of the first authorization method.

19. The system according to clause 18, wherein the security service comprises also an inner security service for an authentication via a token or an application programming interface key.

20. A computer program product for authenticating and authorizing a user identifier to access a service, wherein the service is being secured by an identity access management system, wherein the service is being activatable by a service application programming interface which requires a two-factor authorization in order to start an execution of the service for the requesting user identifier, the computer program product comprising a computer readable storage medium having program instructions embodied therewith, the program instructions being executable by one or more computing systems or controllers to cause the one or more computing systems to receive, by the application programming interface of the service, a service request together with
first data for a first authentication method and
second data for a second authentication method.

confirm a correctness of the first data as a first identity pass key using the first authentication method, confirm a correctness of the second data as a second identity pass key using the second authentication method, wherein the first identity pass key is used as input second authentication method, and wherein the second authentication method differs from the first authentication method, and upon having received the first identity pass key and the second identity pass key, execute the service.

What is claimed is:

1. A computer-implemented method for authenticating and authorizing a user identifier to access a service secured by an identity access management system, wherein said service is activated through a service application programming interface that requires a two-factor authorization to initiate execution of said service for said requesting user identifier, wherein said method comprises:

generating, by an identity access management system, a client certificate, wherein said client certificate corresponds to a client device, and wherein said client certificate constitutes first data;

receiving, by one or more processors, a service request together with said first data for a first authentication method and second data for a second authentication method, wherein said service request connects with an application programming interface of said service;

confirming, by the one or more processors, a correctness of said first data as a first identity pass key using said first authentication method;

generating, by the identity access management system, upon confirming the correctness of said first data, an application programming interface key, wherein said application programming interface key constitutes said second data;

confirming, by the one or more processors, a correctness of said second data as a second identity pass key using said second authentication method, wherein a confirmed first identity pass key is included as input to said second authentication method, and wherein said second authentication method differs from said first authentication method; and executing, by the one or more processors, said service, in response to receipt of said confirmed correctness of both said first identity pass key and said second identity pass key wherein based on a first policy of the first identity pass key and a second policy of the second identity pass key of the identity access management system said first identity pass key and said second identity pass key authorize a first action based on the first policy and a second action based on the second policy of said service.

2. The method according to claim 1, wherein said first authentication method and said second authentication method are selected from a group consisting of a client security certificate, a security token, and an application programming interface key, and wherein said first authentication method is different from said second authentication method.

3. The method according to claim 1, wherein said first authentication method uses a mutual transport layer security (mTLS) standard.

4. The method according to claim 1, wherein confirmation of said correctness of said first data and said second data is performed by an identity access management system.

5. The method according to claim 1, wherein confirmation of said correctness of said first data and confirmation of said correctness of said second data is performed by a selection from a group consisting of said requested service and a separate service in communicative contact with said requested service.

6. The method according to claim 1, wherein said requested service is executed in a cloud computing environment.

7. The method according to claim 1, wherein a client security certificate originates from an identity access management system and serves as an identity pass key.

8. The method according to claim 7, wherein said client security certificate is user generated.

9. The method according to claim 1, wherein said requested service is a combined service, and wherein a security service is integrated into said combined service and comprises an mTLS endpoint of said first authorization method.

10. The method according to claim 9, wherein said security service further comprises an inner security service for an authentication using a selection from a group consisting of a token and an application programming interface key.

11. An authentication and authorization system for authenticating and authorizing a user identifier to access a service secured by an identity access management system, wherein said service is being activated through a service application programming interface, which requires a two-factor authorization to initiate execution of said service for said requesting user identifier, the system comprising:
   one or more computer processors;
   one or more computer-readable storage media, communicatively coupled to said one or more processors, wherein said one or more computer readable storage media stores program code portions that, when executed, enable said one or more processors to:
   generate, by an identity access management system, a client certificate, wherein said client certificate corresponds to a client device, and wherein said client certificate constitutes first data;
   receive a service request together with said first data for a first authentication method and second data for a second authentication method, wherein said service request connects with an application programming interface of said service;
   confirm a correctness of the first data as a first identity pass key using said first authentication method;
   generate, by the identity access management system, upon confirming the correctness of said first data, an application programming interface key, wherein said application programming interface key constitutes said second data;
   confirm a correctness of said second data as a second identity pass key using said second authentication method, wherein a confirmed first identity pass key is included as input to said second authentication method, and wherein said second authentication method differs from said first authentication method; and
   execute said service in response to receipt of said confirmed correctness of both said first identity pass key and said second identity pass key wherein based on a first policy of the first identity pass key and a second policy of the second identity pass key of the identity access management system said first identity pass key and said second identity pass key authorize a first action based on the first policy and a second action based on the second policy of said service.

12. The system according to claim 11, wherein said first authentication method and said second authentication method are selected from a group consisting of a client security certificate, a security token, and an application programming interface key, and wherein said first authentication method is different from said second authentication method.

13. The system according to claim 11, wherein said first authentication method uses a mutual transport layer security (mTLS) standard.

14. The system according to claim 11, wherein confirming the correctness of the first data and the second data is performed by the identity access management system.

15. The system according to claim 11, wherein confirmation of said correctness of said first data and said second data is performed by a selection from a group consisting of said requested service and a separate service in communicative contact with said requested service.

16. The system according to claim 11, wherein a client security certificate originates from an identity access management system and serves as an identity pass key.

17. The system according to claim 16, wherein said client security certificate is user generated.

18. The system according to claim 11, wherein said requested service is a combined service, and wherein a security service is integrated into said combined service and comprises an mTLS endpoint of said first authorization method.

19. The system according to claim 18, wherein said security service also comprises an inner security service for an authentication via a token or an application programming interface key.

20. A computer program product for authenticating and authorizing a user identifier to access a service, wherein said service is being secured by an identity access management system, and wherein said service is activated by a service application programming interface, which requires a two-factor authorization to initiate execution of said service for the requesting user identifier, said computer program product comprising:
   a computer readable storage medium having program instructions embodied therewith, the program instructions being executable by one or more computer processors to cause the one or more computer processors to:
   generate, by an identity access management system, a client certificate, wherein said client certificate corresponds to a client device, and wherein said client certificate constitutes first data;
   receive a service request together with said first data for a first authentication method and second data for a second authentication method, wherein said service request connects with an application programming interface of said service;
   confirm a correctness of said first data as a first identity pass key using said first authentication method;
   generate, by the identity access management system, upon confirming the correctness of said first data, an application programming interface key, wherein said application programming interface key constitutes said second data;

confirm a correctness of said second data as a second identity pass key using said second authentication method, wherein a confirmed first identity pass key is included as input to said second authentication method, and wherein said second authentication method differs from said first authentication method; and execute said service in response to receipt of said confirmed correctness of both said first identity pass key and said second identity pass key wherein based on a first policy of the first identity pass key and a second policy of the second identity pass key of the identity access management system said first identity pass key and said second identity pass key authorize a first action based on the first policy and a second action based on the second policy of said service.

\* \* \* \* \*